US012006258B2

(12) United States Patent
Perez Trigueros et al.

(10) Patent No.: US 12,006,258 B2
(45) Date of Patent: Jun. 11, 2024

(54) ARTIFICIAL AGGLOMERATE STONE ARTICLE COMPRISING FELDSPAR GRANULES

(71) Applicant: COSENTINO RESEARCH & DEVELOPMENT, S.L., Almeria (ES)

(72) Inventors: Laura Perez Trigueros, Almeria (ES); Carmen Maria Montero Perez, Almeria (ES); Lucia Frattini, Almeria (ES); Javier Alvarez De Diego, Almeria (ES)

(73) Assignee: Cosentino Research & Development, S.L., Almeria (ES)

( * ) Notice: Subject to any disclaimer, the term of this patent is extended or adjusted under 35 U.S.C. 154(b) by 0 days.

(21) Appl. No.: 17/437,289

(22) PCT Filed: Oct. 7, 2020

(86) PCT No.: PCT/EP2020/078038
§ 371 (c)(1),
(2) Date: Sep. 8, 2021

(87) PCT Pub. No.: WO2021/069464
PCT Pub. Date: Apr. 15, 2021

(65) Prior Publication Data
US 2022/0089485 A1 Mar. 24, 2022

(30) Foreign Application Priority Data
Oct. 8, 2019 (EP) .................................... 19382876

(51) Int. Cl.
C04B 14/04 (2006.01)
C04B 20/00 (2006.01)
C04B 26/02 (2006.01)
C04B 40/00 (2006.01)
C04B 103/00 (2006.01)
C04B 111/54 (2006.01)

(52) U.S. Cl.
CPC ............ C04B 14/041 (2013.01); C04B 14/04 (2013.01); C04B 14/045 (2013.01); C04B 20/008 (2013.01); C04B 26/02 (2013.01); C04B 40/0067 (2013.01); C04B 40/0089 (2013.01); C04B 2103/0075 (2013.01); C04B 2111/54 (2013.01); C04B 2111/542 (2013.01)

(58) Field of Classification Search
CPC ..... C04B 14/041; C04B 20/008; C04B 26/02; C04B 40/0067; C04B 40/0089; C04B 2111/54; C04B 2103/0075; C04B 14/045; C04B 14/22; C04B 18/025; C04B 18/165; C04B 40/0071; C04B 14/04; C04B 20/00; C04B 40/00; C04B 2111/542; B28B 11/24; B28B 1/08; B29C 67/24; B29C 43/22; B32B 3/30; Y02W 30/91
See application file for complete search history.

(56) References Cited

U.S. PATENT DOCUMENTS

| 4,204,820 A | 5/1980 | Toncelli et al. | |
|---|---|---|---|
| 2011/0037034 A1* | 2/2011 | Ramon Moreno | ... B29C 43/003 252/514 |
| 2020/0299188 A1* | 9/2020 | Chen | ....................... C04B 14/06 |

FOREIGN PATENT DOCUMENTS

| CN | 1827551 A | 9/2006 | |
|---|---|---|---|
| CN | 1323048 C | * 6/2007 | |
| CN | 109734356 A | * 5/2019 | ............ C04B 14/06 |
| EP | 2011632 A2 | 1/2009 | |
| EP | 2216305 A1 | * 8/2010 | ........... B29C 43/003 |
| EP | 2216305 A1 | 8/2010 | |
| WO | 2007014809 A1 | 2/2007 | |
| WO | 2009068714 A1 | 6/2009 | |

OTHER PUBLICATIONS

CN-1323048-C, Luo machine translation (Year: 2007).*
Mesh vs Micron [retrieved from internet, Feb. 3, 2022 <URL:https://filterbag.com/U-S-Mesh-vs-Micron-21.html>] (Year: 2022).*
Michaud, 911 Metallurgist, Sep. 30, 2016 [retrieved from internet, Feb. 7, 2022 <URL: https://www.911metallurgist.com/blog/group-different-feldspars-minerals>] (Year: 2016).*
Imerys Product Specification G-200 HP [retrieved from internet at May 19, 2022 <URL:file:///C:/Users/mguinoouzzle/Documents/Patent%20Applications/Final/69%20Cosentino%2017437289%20agglomerate/Imerys%20G-200HP%20Prod%20Sheet%20NPL%202010.pdf>] (Year: 2008).*
Imerys MSDS G-200 HP [retrieved from internet at May 19, 2022 <URL:https://tuckerspotteryeshop.com/wp-content/uploads/msds/raw_material/G-200HPMSDS2011.pdf>] (Year: 2010).*
IndiaMart (2012) Soda Feldspar Powder [retrieved from internet at Sep. 23, 2022 from <URL:https://www.indiamart.com/proddetail/soda-feldspar-powder-22233570048.html?pos=6&kwd=soda%20feldspar&tags=|||7661.7476|Price|product>]. (Year: 2012).*
Wayback Machine. Internet Archive. 12 captures for IndiaMart Hardik Enterprises powdered white soda feldspar powder. 1st capture is Feb. 21, 2012. (Year: 2012).*
AKJ Group. Soda Feldspar. [retrieved from the internet at 2-10-223 from <URL:https://akjminchem.com/soda-feldspar/]. (Year: 2018).*
Wayback of AKJ Group Soda Feldspar, zoomed in copy [retrieved from the internet at 2-10-223 from <URL:https://web.archive.org/web/20180817090452/https://akjminchem.com/soda-feldspar/>] (Year: 2018).*

(Continued)

Primary Examiner — Anthony J Green
Assistant Examiner — Marites A Guino-O Uzzle
(74) Attorney, Agent, or Firm — Finnegan, Henderson, Farabow, Garrett & Dunner, LLP

(57) ABSTRACT

The invention relates to the use of feldspar granules with a particular combination of oxide constituents in the manufacture of artificial agglomerate stone materials and to the agglomerate stone materials resulting thereof.

19 Claims, No Drawings

(56) References Cited

OTHER PUBLICATIONS

Wayback of AKJ Group Soda Feldspar with Feldspar Chemical Properties/Composition Table (Year: 2018).*
Wayback of AKJ Group Soda Feldspar with Feldspar Price in India Table comprising AM-10S200 (Year: 2018).*
John Britt. Mesh Size (2011) [retrieved from internet at Feb. 10, 2023 from <URL:https://ceramicartsnetwork.org/ceramic-recipes/recipe/Mesh-Size>]. (Year: 2011).*
Di Benedetto F, Giaccherini A, Montegrossi G, Pardi LA, Zoleo A, Capolupo F, Innocenti M, Lepore GO, d'Acapito F, Capacci F, Poli C. Chemical variability of artificial stone powders in relation to their health effects. Scientific reports. Apr. 25, 2019;9(1):1-3. XP055677634; DOI: 1.1038/s41598-019-42238-2.
International Search Report including Written Opinion for PCT/EP2020/078038 dated Jan. 13, 2021; 13 pages.
Technology of Ceramic Production Process, Jinhua Xiang et al, p. 18, Wuhan Polytechnic University Press, Dec. 2013 (P112-29112ES).
Search Result for Materials in Traditional Ceramics; https://digitalfire.com/material/search/feldspar.
Zhou et al., "Respiratory Pharmacology and Therapeutics" One Beijing: People's Health Press 1st Edition. Feb. 1999.
Soda Feldspar Powder—Manufacturers, Suppliers & Dealers | Soda Feldspar Exporters | AKJMinchem, http://akjminchem.com/soda-feldspar/, Dec. 31, 2018.
Imerys Material Safety Data Sheet for G-200 HP, from https://tuckerspotteryeshop.com/wp-content/uploads/msds/raw_material/G-200HPMSDS2011.pdf, revised Jan. 28, 2011.

* cited by examiner

ARTIFICIAL AGGLOMERATE STONE ARTICLE COMPRISING FELDSPAR GRANULES

CROSS-REFERENCE TO RELATED APPLICATIONS

The present application is a national phase entry under 35 U.S.C. § 371 of International Application No. PCT/EP2020/078038 filed Oct. 7, 2020, which claims priority from European Patent Application No. 19382876.1 filed Oct. 8, 2019, all of which are incorporated herein by reference.

FIELD OF THE INVENTION

The invention is related to materials for construction, decoration and architecture, made of artificial agglomerate stone, as well as to their manufacture and fabrication. Particularly, the invention falls within the technological field of artificial stone articles composed of inorganic fillers selected from stone, stone-like or ceramic materials, and a hardened organic resin, manufactured by a process which includes vacuum vibrocompaction and hardening of unhardened agglomerate mixtures.

BACKGROUND OF THE INVENTION

Artificial agglomerate stone articles which simulate natural stones, also known as engineered stone articles, are common in the construction, decoration, architecture and design sectors. The processes for their manufacture at industrial scale are well established nowadays.

One of most popular artificial stone materials, highly appreciated by their aesthetic, hardness and resistance to staining and wear, are the so-called quartz agglomerate surfaces. They are extensively used for countertops, claddings, floorings, sinks and shower trays, to name a few applications. They are generally called artificial stones, and their applications coincide with the applications of natural stones such as marble or granite. They can be made simulating the colors and patterns in natural stone, or they might also have a totally artificial appearance, e.g. with bright red or fuchsia colors. The basis of their composition and the technology currently used for their manufacture dates back from the late 1970s, as developed by the Italian company Breton SpA, and which is nowadays commercially known in the sector under the name Bretonstone®. The general concepts hereof are described, for example, in the patent publication U.S. Pat. No. 4,204,820. In this production process, quartz and/or cristobalite stone granulate, having varied particle sizes, are firstly mixed with a hardenable binder, normally a liquid organic resin. The resulting mixture is homogenized and distributed on a temporary mold, wherein it is then compacted by vibrocompaction under vacuum and subsequently hardened.

A different sort of artificial agglomerate materials is the generally known 'solid surface'. With this rather indefinite term, the industry refers to construction materials of hardened (mostly acrylic) organic resin with ATH (alumina trihydrate, bauxite) as predominant filler. Such products are produced by cast-molding the liquid acrylic resin and ATH flowable mixture, optionally together with vibration to remove air bubbles, and then heat hardening the mixture. Due to the requirement of enough flowability to facilitate casting and air removal, the amount of liquid resin is normally not lower than 20 wt. % of the uncured mixture. In comparison with quartz surfaces, solid surfaces suffer from lower hardness and wear resistance, and are inferior when trying to mimic the appearance of natural stones (the user associates them with plastic composites, and not with natural stones).

Other combinations of stone granulate filler and binder have been proposed, with varied commercial success. Thus, for example, marble and granite have been tried as granulates for agglomerates together with organic resins, but they resulted in materials with significantly lower performance than quartz surfaces for their use as construction materials and in materials with highly limited possibilities regarding their appearance. Myriad of other mineral and non-mineral granulate fillers have been described, mostly in the patent literature, such as recycled glass, glass frits, glass beads, feldspars, porphyry, amorphous silica, ceramics, dolomite, basalt, carbonates, metal silicon, fly-ash, shells, corundum, silicon carbide, among many others. On the other hand, inorganic binders, such as hydraulic cement, have been used instead of organic resins in commercial agglomerate artificial stone for building applications.

Quartz and cristobalite are two of the most common crystalline forms of silica ($SiO_2$) in nature, cristobalite being significantly less frequent. Quartz is present in all types of rocks, igneous, metamorphic and sedimentary. Cristobalite is a high temperature crystalline polymorph of silica, formed in nature as result of volcanic activity, or artificially, by the catalyzed conversion of quartz at high temperature in a rotary kiln. Both quartz and cristobalite have high melting points, high hardness, they are translucent or transparent, and relatively inert to chemical attacks. These properties, together with their abundance and availability, have made them extremely useful as granulate filler for quartz surfaces. Cristobalite is furthermore used in those materials due to its outstanding whiteness. The amount of quartz/cristobalite in those materials normally range from 50-95 wt. %, the rest being other inorganic fillers and the hardened organic resin.

As mentioned above, quartz and cristobalite have several characteristics that make them ideal fillers for the application in the manufacture of durable construction/decoration surfaces, such as high abundance and availability, hardness, translucency, whiteness and chemical inertness. However, they have at least one very serious drawback. The fine fraction of respirable crystalline silica dust generated during the manufacture of the artificial agglomerate stone containing quartz or cristobalite, or when this agglomerate material is mechanically processed, possess a serious occupational health risk for workers or fabricators. Prolonged or repeated inhalation of the small particle size fraction of crystalline silica dust has been associated with pneumoconiosis (silicosis) and other serious diseases. To avoid this hazard, workers potentially exposed to high levels of the respirable fraction of crystalline silica dust are required to wear personal protection equipment (e.g. respirators with particle filter), to work under ventilation for efficient air renewal and to use measures which fight the source of the dust (e.g. processing tools with water supply or dust extraction).

To cope with this shortcoming from the raw material side, natural materials such as feldspar could be proposed as substitute of quartz in quartz surfaces. Indeed, feldspars have been described as suitable filler in this type of products, for example in EP2011632A2 examples 1 or 2. However, the problem with these natural raw materials is the variability in their characteristics, such as color, composition, transparency, etc. Feldspar and other natural minerals are furthermore very frequently accompanied by substantive amounts of quartz.

In some literature references, feldspars have been mentioned as possible fillers for artificial stone agglomerates, in combination with quartz. Thus, for instance, EP2011632A2 examples 1 and 2, and EP2216305A1 example 2, or WO2009068714A1 describe agglomerate unhardened mixtures comprising different amounts of feldspar together with quartz and cristobalite granulates. In WO2007014809A1, the different hardness of feldspars (6 Mohs) compared to marble (4-5 Mohs), granite (6-7 Mohs) or quartz (7 Mohs) is exploited for producing agglomerate materials with a visual surface appearance of split stone or 'crocodile skin'. The idea behind this disclosure is that surface machining of artificial stone agglomerates having combinations of at least two of those minerals with different hardness results in greater score of the softer granulate material, and that produces the desired surface finish.

Feldspars are a large group of metal aluminosilicate minerals, where the metal may be alkali metals or alkaline earth metals, making up to 50% of Earth's crust and present in all types of rocks, igneous (e.g. granite), metamorphic, and sedimentary, in all parts of the world. Feldspars are extensively used in the industry for the manufacture of a wide variety of glass and ceramic products, and also as fillers for paints, plastics and rubber. There are nearly 20 members recognized in the feldspar group of minerals, with only about nine families well characterized and common. They form crystals with a tendency to be multiply twinned, and are moderately hard, with a Mohs hardness around 6-6.5.

The feldspar group is frequently represented by mineralogists by a solid solution system triangular diagram with pure albite ($NaAlSi_3O_8$) and pure anorthite ($CaAl_2Si_2O_8$) at the endpoints of the plagioclase series, and with pure potassium orthoclase ($KAlSi_3O_8$) in the apex of the triangle confronted to the plagioclase series. The full series of mineral compositions between albite and anorthite does indeed occur in nature, called the plagioclase feldspars, presenting varying relative abundance of sodium and calcium ions through the feldspar mineral. The names and compositions boundaries of the minerals found in this series is arbitrary and in general, they are quite similar in their properties. On the other hand, the series of solid solution minerals with compositions between albite $NaAlSi_3O_8$ and $KAlSi_3O_8$ (orthoclase, microcline, pure potassium sanidine) is known as the alkali feldspar series or simply, alkali feldspars.

Due to this large variability in their compositions, feldspars might present different colors, with dominating white, pink, grey or brown. They can be from translucent to opaque, with two directions of perfect cleavage that usually intersect close to a 90° angle. For their industrial use, they are crushed and/or powdered. The feldspar minerals in nature are often accompanied by significant amounts of other minerals, such as quartz, clay, mica, tourmaline and muscovite, and can be enriched by magnetic separation, flotation or aeration processes.

Due to their high abundance in nature, hardness level, tendency to form crystals and relatively good inertness to chemicals, feldspars would be a potentially good candidate to replace at least a fraction of the quartz in the artificial stone agglomerates, to address the problematic toxicity of the respirable crystalline silica. However, most demanding applications of the artificial stone agglomerate require complex chromatic combinations of color tones and color depth, and therefore, filler granules with high levels of whiteness, translucency (which translates into color depth) and color homogeneity. In this regard, feldspars granulates have shown to be generally impractical.

These limitations are particularly important when the smallest particle-size fraction of quartz (known as the micronized fraction), is targeted for replacement by feldspar granules with similar particle-sizes. This small particle fractions of quartz are the most concerning ones, when toxicology is taken into consideration, for their ability to remain dispersed in the air where they can be inhaled by workers in the quartz agglomerate manufacturing plants. In that case, the type of micronized feldspar granules that could be incorporated to the agglomerate in significant amounts, replacing micronized quartz, without sacrificing the palette of colors or the color depth achievable, has not been reported.

Also, the reduction on the crystalline silica content would not be as significant as it might be initially assumed, when replacing quartz granules with feldspar granules, since feldspar granules frequently comprise significant amounts of quartz mineral, which can be up to 35% or even more.

There is therefore a remaining need for a material in granule form for its use as filler in artificial agglomerate stone articles which has a combination of the following advantages:
- it is highly available and affordable,
- does not generate troubling levels of respirable crystalline silica during handling or processing,
- does not limit the chromatic effects and color richness of the currently available quartz agglomerate articles,
- it can be used with minor modifications in the currently available industrial manufacturing processes for quartz agglomerate articles, and
- it does not impair the performance of the agglomerate articles, in terms of scratch resistance, durability, stain- and chemical-resistance, when compared to current quartz agglomerate articles.

SUMMARY OF THE INVENTION

The invention is based on the finding by the inventors that some specific types of feldspar granules, which can be defined by their chemical composition of specific metal oxides, can be used as fillers in the manufacture of artificial agglomerate stone articles replacing quartz granules. These feldspar granules do not suffer from the shortcomings observed until now for this type of fillers.

Thus, in a first aspect, the invention is concerned with an artificial agglomerate stone material comprising inorganic fillers and a hardened binder, wherein the inorganic fillers comprise feldspar granules comprising a combination of oxides according to Formula A or Formula B:

|  | Formula A | Formula B |
| --- | --- | --- |
| $SiO_2$ | 60.0-69.5 wt. % | 60.0-69.5 wt. % |
| $Al_2O_3$ | 17.0-20.0 wt. % | 17.0-20.0 wt. % |
| $Na_2O$ | 10.0-11.9 wt. % | 0.0-2.0 wt. % |
| $K_2O$ | 0.0-2.0 wt. % | 12.0-16.9 wt. % |
| $Fe_2O_3 + TiO_2$ | 0.0-0.5 wt. % | 0.0-0.5 wt. % | based on the weight of the feldspar granules and wherein the hardened binder is a hardened organic resin.

In a second aspect, the invention is concerned with the use of feldspar granules as defined in the first aspect, for the manufacture of an artificial agglomerate stone material. The use of these feldspar granules allows to reduce the emissions of crystalline silica when the material is manufactured and/or mechanized (i.e. cut, gauged, polished, etc.).

In a third aspect, the invention is directed to a process for preparing an artificial agglomerate stone material, comprising:
a) mixing a hardenable binder and inorganic fillers comprising the feldspar granules defined in the first aspect,
b) vacuum vibrocompacting the mixture obtained in a) in a mold, and
c) hardening the compacted mixture obtained in b)
wherein the hardenable binder is a hardenable organic resin.

DETAILED DESCRIPTION OF THE INVENTION

The feldspar granules according to the different aspects of the invention present very good properties for replacing quartz in the manufacture of agglomerate stone articles. They have excellent colorimetry and transparency properties and, when mixed with resin, they do not present an important color deviation from the color of mixtures of the same resin with high-quality quartz granules. The feldspar granules according to the invention have also a hardness (around 6.5 in the Mohs scale) similar to quartz, a good resistance to chemical attack by acids and bases and low porosity.

Furthermore, the crystalline silica content in form of quartz of the feldspar granules is very low, reducing the toxicological risks caused by inhalation of respirable crystalline silica during their handling or afterwards, during the machining of the artificial agglomerate stone articles produced therewith, when compared with other feldspars, quartz or cristobalite granules.

These properties, together with the high availability of this material in nature, result in the feasibility of straightforwardly replacing quartz granules by the feldspar granules of the invention, overcoming the drawbacks encountered until now and without having to modify importantly the current formulations and/or manufacturing processes, and without deteriorating the performance and the visual appearance of these products.

As is well known in the art, the term "feldspar" designates a large group of crystalline minerals found in nature, formed by natural processes (e.g. metamorphism, or crystallization in slow-cooled rocks at high earth depths or from magma), and found in rocks. They are composed of monoclinic and triclinic silicates of aluminum with alkali or alkaline earth metals, commonly potassium, sodium and calcium. Minerals in the feldspar group fit the formula: $X(Al, Si)_4O_8$, wherein X can be alkali or alkaline earth metal such as K, Na, Ca, Ba, Rb and Sr, generally Na, K and Ca. Examples of minerals coming within the term feldspar include plagioclase feldspars and alkali feldspars, such as andesine, albite, anorthoclase, anorthite, labradorite, microcline, orthoclase, oligoclase, sanidine and bytownite.

The terms hardened organic resin and hardenable organic resin are well known in the art. According to an embodiment, organic resin or hardenable organic resin shall both be understood as a material of predominantly organic nature formed by a compound or a mixture of compounds, optionally together with a solvent. The compound or the compounds in the mixture of compounds in the resin might be monomeric, oligomeric or polymeric, optionally with variable molecular weights and crosslinking degrees. At least some of the compounds in the hardenable organic resin, and optionally also the solvent, will have functional reactive groups capable of undergoing curing by a crosslinking or curing reaction which hardens the organic resin, resulting in a hardened organic resin (or hardened binder) when the curing is concluded.

In the present application, the term "granules" usually refers to individual units (particles). Thus, the term encompasses units ranging from infinitesimal powder particulates with sizes on the micrometer scale up to comparatively large pellets of material with sizes on the millimeter scale. This term encompasses particulate products of a variety of shapes and sizes, including grain particles, fines, powders, or combinations of these.

The particle size, also called particle diameter, of the granules can be measured by known screening separation using sieves of different mesh size. The term "particle size" as used herein, means the range in which the diameter of the individual particles in the feldspar granules falls. It can be measured by particle retention or passage on calibrated sieves that have measured mesh size openings, where a particle will either pass through (and therefore be smaller than) or be retained by (and therefore larger than) a certain sieve whose size openings are measured and known. Particle sizes are defined to be within a certain size range determined by a particle's ability to pass through one sieve with larger mesh openings or 'holes" and not pass through a second sieve with smaller mesh openings. For feldspar granules with a particle size <200 micrometers, the particle size distribution of a granule sample can be measured by laser diffraction with a commercial equipment (e.g. Malvern Panalytical Mastersizer 3000 provided with a Hydro cell). For the measurement, the granule sample might be dispersed in demineralized water assisted by an ultrasound probe. The laser diffractometer provides particle distribution curves (volume of particles vs. particle size) and the D10, D50 and D90 statistical values of the particle population of the sample (particle size values where 10%, 50% or 90% of the sample particle population lies below this value, respectively).

The composition of the granules might be obtained by X-ray fluorescence (XRF), a technique well-established in the mineral technological field. The composition of the granules indicated herein corresponds preferably to the average, calculated from at least 3 repetitions of the measure, of the composition of samples containing a mass of granules (e.g. 1 gram of granules).

The skilled person readily understands that, when a composition or material is defined by the weight percentage values of the components it comprises, these values can never sum up to a value which is greater than 100%. The amount of all components that said material or composition comprises adds up to 100% of the weight of the composition or material.

The feldspar granules of the different aspects of the invention are characterized by a composition which comprises oxides according to the ranges in Formula A or in Formula B in weight percent, based on the weight of the feldspar granules:

|  | Formula A | Formula B |
|---|---|---|
| $SiO_2$ | 60.0-69.5 wt. % | 60.0-69.5 wt. % |
| $Al_2O_3$ | 17.0-20.0 wt. % | 17.0-20.0 wt. % |
| $Na_2O$ | 10.0-11.9 wt. % | 0.0-2.0 wt. % |
| $K_2O$ | 0.0-2.0 wt. % | 12.0-16.9 wt. % |
| $Fe_2O_3 + TiO_2$ | 0.0-0.5 wt. % | 0.0-0.5 wt. % |

It needs to be understood that the feldspar granules have a combination of the composition ranges in the preceding table.

Preferably, the feldspar granules comprise 60.0-68.0 wt. % of $SiO_2$ based on the weight of the feldspar granules. More preferably, 63.0-68.0 wt. % of $SiO_2$.

The feldspar granules comprise preferably 17.0-19.5 wt. % of $Al_2O_3$ based on the weight of the feldspar granules. More preferably, 18.0-19.5 wt. % of $Al_2O_3$.

The feldspar granules according to Formula A comprise preferably 10.0-11.5 wt. % of $Na_2O$ based on the weight of the feldspar granules. More preferably, 10.5-11.5 wt. % of $Na_2O$.

The feldspar granules according to Formula B comprise preferably 0.0-1.0 wt. % of $Na_2O$ based on the weight of the feldspar granules.

The feldspar granules according to Formula A comprise preferably 0.0-1.0 wt. % of $K_2O$, more preferably 0.0-0.5 wt. %, based on the weight of the feldspar granules. Even more preferably, 0.01-1.0 wt. % or 0.01-0.5 wt. % of $K_2O$.

The feldspar granules according to Formula B comprise preferably 13.0-16.0 wt. % of $K_2O$ based on the weight of the feldspar granules.

Preferably, the feldspar granules comprise 0.0-0.2 wt. % of $Fe_2O_3+TiO_2$, more preferably 0.0-0.1 wt. %, based on the weight of the feldspar granules. In an embodiment, the granules comprise 0.01-0.2 wt. % or 0.01-0.1 wt. % of $Fe_2O_3+TiO_2$.

In a preferred embodiment, the feldspar granules are characterized by a composition which comprises oxides according to the following ranges in weight percent, based on the weight of the granules:

|  | Formula A' |
| --- | --- |
| $SiO_2$ | 60.0-68.0 wt. % |
| $Al_2O_3$ | 17.0-19.5 wt. % |
| $Na_2O$ | 10.0-11.9 wt. % |
| $K_2O$ | 0.0-2.0 wt. % |
| $Fe_2O_3 + TiO_2$ | 0.0-0.5 wt. % |

In another preferred embodiment, the feldspar granules are characterized by a composition which comprises oxides according to the following ranges in weight percent, based on the weight of the granules:

|  | Formula A'' |
| --- | --- |
| $SiO_2$ | 63.0-68.0 wt. % |
| $Al_2O_3$ | 18.0-19.5 wt. % |
| $Na_2O$ | 10.0-11.5 wt. % |
| $K_2O$ | 0.0-2.0 wt. % |
| $Fe_2O_3 + TiO_2$ | 0.0-0.5 wt. % |

There might be other inorganic oxides present in the composition of the feldspar granules, as well as some organic matter or material which is calcined and desorbed during the XRF analysis at 1050° C. until there is no more weight lost (known as weight 'lost on ignition' or L.O.I.).

The sum of the weight percentages of $SiO_2$, $Al_2O_3$, $Na_2O$ and $K_2O$ in the granules is preferably at least 85 wt. %, or at least 90 wt. %, or even at least 93 wt. %, based on the weight of the granules. The sum of the weight percentages of the $SiO_2$, $Al_2O_3$, $Na_2O$ and $K_2O$ in the granules is preferably in the range 85.0-99.8 wt. %, preferably 90.0-99.5 wt. %, or 93.0-99.5 wt. %, based on the weight of the granules. Preferably, the rest being other inorganic oxides and other matter lost on ignition (L.O.I.).

Also, preferably, the L.O.I. is lower than 10.0 wt. %, more preferably lower than 7.0 wt. %, or lower than 5.0 wt. %, based on the weight of the granules. In a further embodiment, the amount of L.O.I. is in the range 0.01-10.0 wt. % or 0.5-10.0 wt. %, based on the weight of the granules.

The feldspar granules may further comprise CaO in the composition. In a particular embodiment, the feldspar granules comprise 0.0-6.0 wt. % of CaO, preferably 0.0-3.0 wt. %, based on the weight of the feldspar granules. More preferably, 0.01-6.0 wt. % or 0.05-3.0 wt. % of CaO.

Further, the feldspar granules according to Formula A comprise preferably 0.0-6.0 wt. % of CaO, preferably 0.0-3.0 wt. %, more preferably 0.0-3.0 wt. %, based on the weight of the feldspar granules. More preferably, 0.01-6.0 wt. % or 0.05-3.0 wt. % of CaO.

The feldspar granules according to Formula B comprise preferably 0.0-2.0 wt. % of CaO, preferably 0.0-1.0 wt. %, based on the weight of the feldspar granules. More preferably, 0.01-2.0 wt. % or 0.01-1.0 wt. % of CaO.

The sum of the weight percentages of $SiO_2$, $Al_2O_3$, $Na_2O$, $K_2O$ and CaO in the granules is preferably at least 90 wt. %, or at least 92 wt. %, or even at least 95%, based on the weight of the granules. The sum of the weight percentages of the $SiO_2$, $Al_2O_3$, $Na_2O$, $K_2O$ and CaO in the granules is preferably in the range 90.0-99.8 wt. %, preferably 95.0-99.8 wt. %, based on the weight of the granules. Preferably, the rest being other inorganic oxides and other matter lost on ignition (L.O.I.).

In a preferred embodiment, the feldspar granules are further characterized by a ratio of weight percent of $SiO_2/Al_2O_3$ equal to or less than 3.8, preferably equal to or less than 3.6, and also preferably equal to or more than 3.2. According to an embodiment of the invention, the ratio of weight percent of $SiO_2/Al_2O_3$ is 3.2-3.8, preferably 3.2-3.6.

Further, in preferred embodiments, the water content of the feldspar granules is preferably <0.5 wt. %, more preferably <0.1 wt. %, based on the weight of the granules. Water content can be determined in the feldspar granules by drying at temperatures close to 100° C. as is usual in the art. The water content would be measured in the granules just before they are mixed with the organic resin. This water content will not increase during the manufacture of the artificial agglomerate stone article. It has been found that if the water content is higher, the hardening of the resin, e.g. the curing of the resin, and the adhesion of the granules to the hardening resin, might be detrimentally affected.

Therefore, in a preferred embodiment, the feldspar granules may comprise 0.0-0.5 wt. % of water, more preferably 0.0-0.1 wt. %, based on the weight of the granules. In a further embodiment, the feldspar granules may comprise 0.01-0.5 wt. % or 0.01-0.1 wt. % of water based on the weight of the granules.

According to an embodiment, the feldspar granules of Formula A of the different aspects of the invention are characterized by a composition which comprises oxides according to the following ranges in weight percent, based on the weight of the feldspar granules:

|  | Range (wt. %) |
| --- | --- |
| $SiO_2$ | 60.0-68.0 wt. % |
| $Al_2O_3$ | 17.0-20.0 wt. % |
| $Na_2O$ | 10.0-11.9 wt. % |
| CaO | 0.0-6.0 wt. % |

-continued

| | Range (wt. %) |
|---|---|
| K₂O | 0.0-1.0 wt. % |
| Fe₂O₃ + TiO₂ | 0.0-0.5 wt. % |

In a further embodiment, the feldspar granules of Formula A comprise oxides according to the following ranges in weight percent, based on the weight of the feldspar granules:

| | Range (wt. %) |
|---|---|
| SiO₂ | 63.0-68.0 wt. % |
| Al₂O₃ | 18.0-19.5 wt. % |
| Na₂O | 10.0-11.5 wt. % |
| CaO | 0.0-3.0 wt. % |
| K₂O | 0.0-1.0 wt. % |
| Fe₂O₃ + TiO₂ | 0.0-0.5 wt. % |

According to an embodiment, the feldspar granules of Formula B of the different aspects of the invention are characterized by a composition which comprises oxides according to the following ranges in weight percent, based on the weight of the feldspar granules:

| | Range (wt. %) |
|---|---|
| SiO₂ | 62.0-69.5 wt. % |
| Al₂O₃ | 17.0-19.5 wt. % |
| Na₂O | 0.0-2.0 wt. % |
| CaO | 0.0-2.0 wt. % |
| K₂O | 12.5-16.0 wt. % |
| Fe₂O₃ + TiO₂ | 0.0-0.5 wt. % |

In a further embodiment, the feldspar granules of Formula B comprise oxides according to the following ranges in weight percent, based on the weight of the feldspar granules:

| | Range (wt. %) |
|---|---|
| SiO₂ | 63.5-68.0 wt. % |
| Al₂O₃ | 17.0-19.0 wt. % |
| Na₂O | 0.0-2.0 wt. % |
| CaO | 0.0-1.0 wt. % |
| K₂O | 13.0-16.0 wt. % |
| Fe₂O₃ + TiO₂ | 0.0-0.5 wt. % |

The feldspar granules may comprise silica in crystalline form (as quartz or cristobalite). However, preferably, the crystalline silica concentration in the feldspar granules is ≤10 wt. %, or ≤8 wt. %, or even ≤5 wt. %, based on the weight of the feldspar granules. In an embodiment, the crystalline silica concentration in the granules is in the range 0.0-10.0 wt. %, or 0.0-8.0 wt. %, or even 0.0-5.0 wt. %, based on the weight of the granules. In an embodiment, the crystalline silica concentration in the granules is in the range 0.1-10.0 wt. %, or 0.1-8.0 wt. %, or even 0.5-5.0 wt. %, based on the weight of the granules.

The total content of crystalline phases in the feldspar granules according to any aspect of the invention is preferably in the range 80.0-99.0 wt. %, or even 81.0-97.0 wt. % of the weight of the granules, the rest being amorphous phase. In preferred embodiments of the invention, the amount of the albite ($NaAlSi_3O_8$) crystalline phase in the feldspar granules according to Formula A is preferably 80-97.0 wt. %, or even 81.0-95.0 wt. % of the weight of the granules. In additional preferred embodiments of the invention, the sum of the amount of the microcline ($KAlSi_3O_8$) and the orthoclase ($KAlSi_3O_8$) crystalline phases in the feldspar granules according to Formula B is preferably 80-97.0 wt. %, or even 81.0-95.0 wt. % of the weight of the granules.

The amount of crystalline silica and other crystalline phases in the feldspar granules can be determined by powder X-Ray Diffraction analysis (XRD) using the Rietveld method for quantification, a technique amply used in the field. In order to improve the accuracy of the results, the internal crystalline standard method described by A. G. De La Torre et al. (J. Appl. Cryst. (2001), 34, 196-202) may be used for the quantification of amorphous content of the feldspar granules.

Preferably, the feldspar granules according to the aspects of the invention might have a particle size in a range from 2.0-0.063 mm (grain particles) or it might be lower than 63 micrometers (micronized powder). In the case of grain particles, the particle size might range from 1.2-0.1 mm, or 0.7-0.3 mm, or 0.4-0.1 mm, or 0.3-0.063 mm.

Particularly preferred is the case when the feldspar granules are used as micronized powder, with a particle size D90<50 micrometers, preferably <40 micrometers, and more preferably D90 between 10-40 micrometers.

Suitable feldspar granules include natural rock-forming minerals mined or quarried from their reservoirs and enriched and granulated by known processes, and can be obtained commercially from different sources. It is particularly preferred that the feldspar granules according to the different aspects of the invention have been subjected to at least one flotation separation process, or at least two flotation separation processes, to separate accessory minerals. The feldspar granules have preferably been subjected to magnetic separation, optionally together with the flotation processes.

The desired particle size ranges (granulometry) of the feldspar granules can be obtained by grinding and sieving the mined or quarried minerals, by methods known in the art, such as grinding with ball mills or opposed grinding rollers. The grinding may comprise micronizing the mineral to obtain feldspar granules with average particle size D90<50 micrometers, preferably <40 micrometers, and more preferably D90 between 10-40 micrometers.

The feldspar granules can comprise small amounts of accessory minerals mixed with the predominant feldspar mineral, such as quartz. It needs to be understood that according to the different aspects of the invention, the feldspar granules do not need to be composed solely of feldspar mineral, and other compounds might be present mixed with the feldspar mineral, as long as the average weight composition of the feldspar granules meets the ranges in the claims. The content of feldspar mineral in the feldspar granule of the different aspects of the invention is preferably >85 wt. %, or >90 wt. %, relative to the weight of the granule.

In an aspect, the invention is directed to the use of the feldspar granules of the invention for the manufacture of an artificial agglomerate stone material or article. This use reduces the crystalline silica emissions during manufacturing or mechanizing the artificial agglomerate stone material or article, compared to agglomerate quartz material or articles.

Other aspect of the invention refers to an artificial agglomerate stone material or article comprising inorganic fillers and a hardened organic resin, wherein the inorganic fillers comprise the feldspar granules of the invention.

The amount of feldspar granules in the artificial agglomerate stone material preferably ranges from 2-70 wt. %, or from 2-50 wt. %, or from 2-30 wt. % in relation to the weight of the material. In an embodiment, the amount of feldspar granules in the artificial agglomerate stone material is at least 2 wt. %, or at least 4 wt. %, or even at least 10 wt. %, and/or at most 70 wt. %, or at most 50 wt. %, or at most 30 wt. %, in relation to the weight of the material.

The artificial agglomerate stone material might comprise also inorganic fillers different from the feldspar granules of the invention, preferably selected from stone, stone-like or ceramic materials. Other inorganic fillers different from the feldspar granules in the artificial agglomerate stone material may preferably include synthetic inorganic granules such as recycled silicate glass granules, silicate frit granules, ceramic granules, or mixtures thereof. Preferably, the inorganic fillers (i.e. the sum of the weights of the feldspar granules and of the inorganic fillers different from the feldspar granules of the invention) account for at least 70 wt. %, or at least 80 wt. %, or at least 85 wt. %, and at most 95 wt. %, of the weight of the artificial agglomerate stone material.

Artificial agglomerate stone materials with a low crystalline silica content are preferred. Therefore, it is preferred that all, or at least 90 wt. %, or at least 95 wt. % or at least 99 wt. %, of the inorganic fillers (including feldspar granules and any other inorganic filler different from the feldspar granules of the invention) have a low crystalline silica content, preferably a crystalline silica (quartz, cristobalite or other crystalline polymorphs) content of 0-15 wt. %, or 0-10 wt. %, or 0-7 wt. % relative to the weight of said inorganic fillers. Preferably, at least 95 wt. %, more preferably at least 99 wt. %, of the other inorganic fillers in the artificial agglomerate stone material have a crystalline silica content of 0-10 wt. % relative to the weight of said inorganic fillers.

In particularly preferred embodiments, the artificial agglomerate stone material or article does not comprise >5 wt. %, or even >1 wt. %, relative to the weight of the agglomerate stone material or article, of inorganic fillers (including feldspar granules and any other inorganic filler different from the feldspar granules of the invention) with a crystalline silica content of >15 wt. %, or >10 wt. % relative to the weight of said inorganic fillers.

It is preferred that the artificial agglomerate stone material comprises from 0-5 wt. % relative to the weight of the material, of inorganic fillers (i.e. the sum of the weights of the feldspar granules and of the inorganic fillers different from the feldspar granules of the invention) with a content of crystalline silica of 15-100 wt. % relative to the weight of the inorganic fillers.

In preferred embodiments of the invention, the artificial agglomerate stone material does not comprise inorganic granules with a content of crystalline silica >15 wt. %, or >10 wt. %. In these embodiments, in addition to the feldspar granules according to the claims, the artificial agglomerate stone material further comprises synthetic inorganic granules selected from recycled silicate glass granules, silicate frit granules, ceramic granules, or mixtures thereof. In particularly preferred embodiments, the artificial agglomerate stone material comprises feldspar granules according to the invention, and silicate glass granules (recycled, frit) with less than 1% crystalline silica, preferably wherein the sum of the weights of both feldspar and silicate glass granules accounts for more than 50 wt. %, or more 70 wt. %, of the weight of the artificial agglomerate stone material.

Preferably, the crystalline silica content of the artificial agglomerate stone material is ≤15 wt. %, more preferably ≤10 wt. %, or ≤5 wt. % relative to the weight of the material. The crystalline silica content of the artificial agglomerate stone material may be 0-15 wt. %, more preferably 0-10 wt. %, or 0-5 wt. %, relative to the weight of the material.

It is particularly preferred the case when the feldspar granules comprised in the artificial agglomerate stone material have a particle size D90<50 micrometers, preferably <40 micrometers, and more preferably D90 between 10 and 40 micrometers.

Optionally, the artificial agglomerate stone article of the invention might incorporate the feldspar granules exclusively with a particle size <0.1 mm. In preferred cases, the amount of feldspar granules in the artificial agglomerate article or material with a particle size <0.063 mm is from 10 wt. % to 40 wt. % in relation to the total weight of the article or material.

The weight of inorganic filler (sum of the weights of the feldspar granules and of any inorganic granules different from the feldspar granules) in the artificial stone article is preferably 70-95 wt. %, more preferably 85-95 wt. % in relation to the weight of the artificial agglomerate stone article.

The hardened binder is a hardened (reacted or polymerized) organic resin, more preferably a hardened organic thermosetting resin, suitably liquid when not hardened, and which may be selected from the group made up of unsaturated polyester resins, acrylate and methacrylate-based resins, vinyl resins and epoxy resins. The hardenable organic resins are preferably reactive and can be hardened in a curing (or cross-linking) reaction.

The hardening of the binder (organic resin), and thus, of the mixture after compaction, can ultimately be accelerated by raising the temperature, depending on the organic resin used, and/or by using suitable catalysts and accelerators as known in the art.

The amount of hardened organic resin, in the artificial agglomerate stone material may range from 5-30 wt. %, or from 5-20 wt. %, or from 5-15 wt. %, based on the weight of the material.

In an embodiment, the artificial agglomerate stone material comprises 70-95 wt. %, preferably 80-95 wt. %, of inorganic fillers (i.e. the sum of the weights of the feldspar granules and of the inorganic fillers different from the feldspar granules of the invention) and 5-30 wt. %, preferably 5-20 wt. %, of hardened organic resin, based on the weight of the artificial agglomerate stone material.

According to preferred embodiments, the artificial agglomerate stone article has been obtained by vacuum vibrocompaction and has preferably an apparent density in the range 2000-2600 kg/m$^3$, or from 2100-2500 kg/m$^3$. Apparent density of the artificial agglomerate stone article might be measured according to EN 14617-1:2013-08.

The artificial agglomerate stone material may be in the form of a block, slab, tile, sheets, board or plate.

The artificial agglomerate stone material might be used for construction or decoration, for manufacturing counters, kitchen countertops, sinks, shower trays, walls or floor coverings, stairs or similar.

The invention is also concerned with a process for preparing the artificial agglomerate stone material of the invention, comprising:
a) mixing a hardenable organic resin, and an inorganic filler comprising the feldspar granules of the invention,
b) vacuum vibrocompacting the unhardened mixture obtained in a) in a mold, and
c) hardening the compacted mixture obtained in b).

For the manufacture of the artificial agglomerate article, a hardenable organic resin, such as a liquid organic resin, is mixed with the feldspar granules, and with any optional inorganic fillers different from the feldspar granules forming an (unhardened) agglomerate mixture. The amount of feldspar granules is preferably 1-70 wt. %, or 1-50 wt. %, or 1-30 wt. % of the weight of the agglomerate mixture. The amount of feldspar granules in the agglomerate mixture is at least 2 wt. %, or at least 4 wt. %, or even at least 10 wt. %, and/or at most 70 wt. %, or at most 50 wt. %, or at most 30 wt. %, in relation to the weight of the material. The sum of the weights of the feldspar granules and the optional inorganic fillers different than the feldspar granules is preferably at least 70 wt. %, or at least 80 wt. %, or at least 85 wt. % of the weight of the agglomerate mixture. Preferably, the amount of hardenable organic resin in the agglomerate mixture ranges from 5-30 wt. %, or from 5-15 wt. %.

The mixing can be achieved, for example, by stirring with the use of conventional mixers, in a manner known in the art. The hardenable organic resin might be one which, once hardened, serves to achieve cohesion and adherence between the inorganic fillers in the produced article. The organic resins are preferably thermosetting, liquid and can be selected, for example, from the group made up of unsaturated polyester resins, acrylate-base resins, methacrylate-based resins, vinyl resins and epoxy resins. These resins are preferably reactive and harden in a curing or cross-linking reaction. Additionally, additives can be included in this mixing step, selected from pigments, curing catalysts, curing accelerators, UV stabilizers, or mixtures thereof.

The optional inorganic fillers different from the feldspar granules might be selected from stone, stone-like or ceramic materials, recycled silicate glass granules, silicate frit granules, ceramic granules, or mixtures thereof. These fillers may be incorporated to the agglomerate mixture with different particle sizes and can be obtained from the crushing and/or grinding of natural or artificial materials. These inorganic fillers can be sourced, for example, from specialized companies, which commercialize them already dry and classified according to their particle size.

In an embodiment, the other inorganic fillers different from the feldspar granules are in the form of granules, preferably with a particle size in a range from 2.0-0.063 mm (grain particles) or it might be lower than 63 micrometers (micronized powder). In the case of grain particles of inorganic fillers different from the feldspar granules, the particle size might range from 1.2-0.1 mm, or 0.7-0.3 mm, or 0.4-0.1 mm, or 0.3-0.063 mm.

The inorganic fillers different from the feldspar granules are preferably selected from recycled silicate glass granules, silicate frit granules, ceramic granules, or mixtures thereof. It needs to be understood that the inorganic fillers different from the feldspar granules of the invention may have a composition of oxides different to the composition of the feldspar granules of the invention.

The unhardened agglomerate mixture may comprise other typical additives, such as colorants or pigments, accelerators or catalyzers for the curing or hardening of the resin (e.g. free radical initiators), promoters for the adhesion between the filler and the resin (e.g. silanes). These types of additives and the proportion used thereof are known in the state of the art. Preferably, these additives may be present in the agglomerate mixture in an amount of 0.01-5.0 wt. %, based on the weight of the mixture.

The unhardened agglomerate mixture may be then transported to a distributor device. Distributors suitable are known, such as those used for the distribution of the (unhardened) agglomerate mixtures in the manufacture of quartz agglomerate surfaces. This distributor device is preferably movable along the length of a temporary mold. The mold, in its simplest form, might be embodied by a kraft paper or plastic sheet. Alternatively, the mold might be a more complex elastomeric tray. The distributor device preferably consists of a feeding hopper that receives the mixture in the top opening thereof and a conveyor belt positioned below the bottom outlet opening of the hopper, which collects or extracts the mixture from the hopper and deposits it onto or into the mold (depending on whether the mold is configured as a sheet or a tray). Other distributor devices and molds are possible within the general concept of the invention.

The unhardened agglomerate mixture having been distributed in the mold is preferably covered with a protective sheet on its top surface and subjected to vacuum vibrocompaction. For this, in an example, the mixture is transported inside a compaction area of a press, wherein it is inserted in a sealable chamber. Then, the chamber is sealed, and vacuum is created with appropriate gas evacuation pumps. Once the desired vacuum level has been reached (e.g. 5-40 mbar), the ram of the press exerts a compaction pressure simultaneously with the application of vertical vibration of the piston (e.g. oscillating at 2.000-4.000 Hz). During the vacuum vibrocompaction, the air entrapped in the agglomerate mixture is substantially evacuated.

The compacted mixture then goes to a hardening or curing stage. In this stage, depending on the type of resin, as well as the use or not of any suitable catalysts or accelerants, the mixture is suitably subjected to the effect of temperature in a curing oven, suitably heated at a temperature between 80-120° C., with residence times in the oven generally varying from 20 to 60 minutes. After curing, the hardened compacted mixture is cooled down to a temperature equal to or less than 40° C.

After hardening, the artificial agglomerate article obtained, which can be shaped as blocks, slabs, boards or plates, can be cut and/or calibrated to the desired final dimensions, and may be finished (polished, honed, etc.) on one or both of its larger surfaces, depending on the intended application.

It should be understood that the scope of the present disclosure includes all the possible combinations of embodiments disclosed herein.

EXAMPLES

Definitions and Testing Methods:

XRF: Oxide analysis of the granules might be conducted by X-Ray Fluorescence in a commercial XRF spectrometer. For example, a disc of about 1 g of a sample is mixed with lithium tetraborate and calcined in air atmosphere at a temperature 1.050° C. for 25 minutes prior to analysis in the spectrometer. The results are reported as relative weight percentage of oxides ($SiO_2$, $Al_2O_3$, etc.), together with the weight 'lost on ignition' during calcination (evaporation/desorption of volatiles, decomposition of organic matter). The spectrometer is previously calibrated with multipoint calibration curves of known concentration of standards. The international standard ISO 12677:2011 may be followed for XRF analysis.

XRD: As way of example, the identification and quantification of crystalline phases in the granules can be done by powder X-Ray Diffraction (XRD) using $MoK\alpha_1$ radiation (0.7093 Å) with a commercial equipment (e.g. Bruker D8 Advance) at 2°-35° for 4 hours. Once the X-ray diffraction data is obtained, it is analyzed using the Rietveld method for quantification. The content of crystalline silica phases is calculated as weight percentage of the sample analyzed.

Granulometry: The particle size, also called particle diameter, of the granules can be measured by known screening separation using sieves of different mesh size. For feldspar granules with a particle size <200 micrometers, the particle size distribution can be measured by laser diffraction with a commercial equipment (e.g. Malvern Panalytical Mastersizer 3000 provided with a Hydro cell). For the measurement the granule sample might be dispersed in demineralized water assisted by an ultrasound probe. The laser diffractometer provides particle distribution curves (volume of particles vs. particle size) and the D10, D50 and D90 statistical values of the particle population (particle size values where 10%, 50% or 90% of the sample particle population lies below this value, respectively).

Colorimetry/transparency: Colorimetry and transparency of the granules in polymerized matrix can be measured from disks prepared by mixing 50 g of the granules with 50 g of a commercial unsaturated polyester resin catalyzed with 0.75 g of organic MEKP peroxide and 0.12 g of cobalt octoate (6% cobalt). After homogenization, the mixture is poured to an aluminum mold up to a thickness of 5 mm. The mixture is then hardened at 70° C. for 20 minutes and allowed to reach room temperature afterwards for 30-40 minutes. The aluminum mold is then removed before the colorimetry and transparency of the obtained disk is measured. The colorimetry may be measured in a commercial spectrophotometer (e.g. Konica Minolta CM-3600d) and expressed in values of L* a* b* coordinates (CIELAB color space), where L* is lightness from black (0) to white (100), a* from green (−) to red (+) and b* from blue (−) to yellow (+). Transparency may be measured in a commercial transparency analyzer (e.g. from Sensure SRL) capable of measuring the ratio of white light transmitted through the disk.

Examples According to the Invention and Comparative Examples

Twenty different feldspars in granular form were purchased from different suppliers specialized in the prospection, extraction, separation and enrichment of the feldspar mineral mined from different natural reservoirs. The feldspars were mainly alkali feldspars from the alkali feldspar series, including sodium feldspars, potassium feldspars, and mixed sodium-potassium feldspars. The suppliers included Industrias del Cuarzo S. A., Imerys Ceramics, Minerali Industriali, SCR-Sibelco N. V., Llansá S. A., Kaltun Madencilik Sanayi, Kormad Madencilik Ltd. Sti. and Polat Mining.

For the experiments, the feldspar granules were micronized to a particle size D90 between 18-40 micrometers.

Table 1 shows the results from XRF oxide analysis and 'loss on ignition' L.O.I. of the 20 feldspar granules, both inventive and comparative, subjected to evaluation, averaged from 3 repetitions. The Table 1 also shows the ratio of weight percentages of $SiO_2$ to $Al_2O_3$.

TABLE 1

| Ex. | $SiO_2$ | $Al_2O_3$ | CaO | $Na_2O$ | $K_2O$ | $TiO_2$ | $Fe_2O_3$ | others | L.O.I. | Ratio $SiO_2/Al_2O_3$ |
|---|---|---|---|---|---|---|---|---|---|---|
| FD1 | 66.70 | 19.39 | 0.37 | 11.31 | 0.11 | 0.01 | n.d.‡ | n.d.‡ | 2.11 | 3.43 |
| FD2* | 71.48 | 15.60 | 0.43 | 5.79 | 4.26 | 0.02 | 0.10 | 0.33 | 1.99 | 4.58 |
| FD3* | 73.31 | 14.18 | 0.27 | 5.54 | 3.41 | 0.03 | 0.11 | 0.27 | 2.88 | 5.17 |
| FD4* | 68.12 | 18.01 | 0.92 | 9.83 | 0.22 | 0.03 | 0.01 | 0.02 | 2.84 | 3.78 |
| FD5 | 66.22 | 18.21 | 1.16 | 10.46 | 0.20 | 0.04 | 0.01 | 0.02 | 3.68 | 3.64 |
| FD6* | 72.08 | 14.55 | 0.50 | 3.41 | 6.96 | 0.03 | 0.01 | 0.57 | 1.89 | 4.95 |
| FD7* | 74.70 | 13.40 | 0.14 | 7.45 | 0.31 | 0.19 | 0.40 | 0.14 | 3.27 | 5.57 |
| FD8 | 60.32 | 17.28 | 5.49 | 10.27 | 0.10 | 0.01 | n.d.‡ | 0.11 | 6.42 | 3.49 |
| FD9* | 73.91 | 15.30 | 0.90 | 7.44 | 2.03 | 0.07 | 0.15 | 0.20 | n.d.‡ | 4.83 |
| FD10 | 65.81 | 18.11 | 0.87 | 10.15 | 0.26 | 0.03 | 0.02 | 0.09 | 4.66 | 3.63 |
| FD11* | 64.17 | 18.57 | 0.82 | 10.62 | 0.09 | 0.64 | 0.08 | 1.77 | 3.24 | 3.45 |
| FD12* | 56.62 | 16.39 | 0.59 | 9.66 | 0.09 | 0.12 | 0.03 | 0.44 | 16.06 | 3.45 |
| FD13* | 65.95 | 16.26 | 0.41 | 1.98 | 11.50 | 0.02 | 0.03 | 0.40 | 3.45 | 4.06 |
| FD14* | 74.64 | 13.58 | 0.63 | 5.96 | 0.65 | 0.02 | 0.12 | 0.41 | 3.99 | 5.50 |
| FD15* | 67.53 | 17.20 | 0.58 | 9.58 | 0.43 | 0.26 | 0.19 | 0.50 | 3.73 | 3.93 |
| FD16* | 62.95 | 18.78 | 0.68 | 4.68 | 8.81 | 0.02 | 0.10 | 0.37 | 3.61 | 3.35 |
| FD17* | 66.45 | 18.37 | 1.34 | 9.20 | 0.56 | 0.02 | 0.06 | 0.25 | 3.75 | 3.62 |
| FD18 | 65.75 | 17.34 | 0.02 | 0.67 | 14.42 | 0.02 | 0.01 | 0.64 | 1.13 | 3.79 |
| FD19* | 71.08 | 14.27 | 0.77 | 3.67 | 3.84 | 0.07 | 0.59 | 0.49 | 5.22 | 4.98 |
| FD20 | 63.93 | 19.18 | 1.08 | 10.66 | 0.27 | 0.015 | 0.01 | 0.12 | 4.73 | 3.33 |

‡n.d.: not detected
*Comparative examples.

To evaluate the suitability of the feldspar granules in Table 1 to replace quartz in the manufacture of artificial agglomerate stone articles, the colorimetry and transparency of 50 g of the feldspar granules embedded in 50 g of a matrix of polymerized resin was examined, following the procedure 'Colorimetry/transparency' referred above. Also, the concentration of crystalline silica in form of quartz in the feldspar granules was quantified by XRD. The results obtained are depicted in Table 2, together with the reference values obtained for quartz granules which serve as reference. The quartz granules included in Table 2 as reference are commercial materials currently being used in the manufacture of artificial agglomerate quartz stone articles. The reference quartz is in micronized form, with a D90 of 29 micrometers.

TABLE 2

| | Color | | | Transparency | Quartz content |
|---|---|---|---|---|---|
| | L* | a* | b* | (%) | (%) |
| FD1 | 56.1 | 0.2 | −3.6 | 22 | <2 |
| FD2* | 59.0 | 0.1 | 8.6 | 10 | 25.6 |
| FD3* | 58.5 | 0.1 | 8.0 | 11 | 34.5 |
| FD4* | 49.7 | 0.6 | 1.2 | 21 | 11.3 |

TABLE 2-continued

| | Color | | | Transparency (%) | Quartz content (%) |
|---|---|---|---|---|---|
| | L* | a* | b* | | |
| FD5 | 48.5 | 0.7 | 0.4 | 23 | 3.1 |
| FD6* | 55.8 | 4.8 | 14.1 | 7 | 32.1 |
| FD7* | 42.1 | 6.2 | 11.5 | 6 | 36.3 |
| FD8 | 65.1 | 0.5 | 0.5 | 14 | <2 |
| FD9* | 47.7 | 0.3 | 4.7 | 7 | 27.9 |
| FD10 | 57.0 | 1.8 | −0.7 | 17 | 7.5 |
| FD11* | 54.8 | 8.2 | 20.1 | 6 | 3.7 |
| FD12* | 60.7 | 3.3 | 11.5 | 8 | 2.9 |
| FD13* | 67.7 | 6.0 | 13.4 | 6 | 11.6 |
| FD14* | 56.6 | 6.6 | 13.1 | 8 | 35.8 |
| FD15* | 48.9 | 3.2 | 11.6 | 7 | 10.9 |
| FD16* | 43.7 | 4.8 | 8.9 | 6 | 4.1 |
| FD17* | 54.0 | 2.7 | 8.8 | 7 | 10.7 |
| FD18 | 70.4 | 1.5 | 3.2 | 15 | 7.9 |
| FD19* | 43.7 | 4.8 | 8.9 | 6 | 4.1 |
| FD20 | 54.4 | 1.1 | −3.5 | 22 | <2 |
| Quartz granules | 55.5 | 0.6 | −1.2 | 25 | —† |

†Granules are nearly pure crystalline silica.
*Comparative examples.

From the results in Table 2, the feldspar granules FD2, FD3, FD4, FD6, FD7, FD9, FD13, FD14, FD15 and FD17 present high levels of quartz content, over 10 wt. % in all cases, making them less desirable as alternative to the quartz granules currently used, for the reduction of the toxicological risk of crystalline silica.

Furthermore, FD2, FD3, FD6, FD7, FD11, FD12, FD13, FD14, FD15, FD16, FD17 and FD19 present important deviations in colorimetry from the quartz granule reference, with a significant increase in the value of b*, and in most cases also with a relevant increase of a*. In other words, when these feldspar granules are in a polymerized resin matrix, they importantly turn the color of the matrix towards yellow or orange, when compared with the same matrix incorporating reference quartz granules. Also, FD6, FD7, FD9, FD11, FD12, FD6, FD15, FD16, FD17 and FD19 lack the transparency of the reference quartz granules, necessary to produce, for instance, less opaque and high color depth agglomerate stone articles.

Feldspar granules FD1, FD5, FD8, FD10, FD18 and FD20, have the values of colorimetry and transparency most similar to the reference quartz granules. Synergistically, the quartz content of those granules is <10 wt. %, and in some cases (FD1, FD8 and FD20) even <2 wt. %.

The feldspar granules FD1, FD5, FD8, FD10, FD18 and FD20, were used for the manufacture of artificial agglomerate stone slabs in an industrial setting, in standard lines for the production of commercial quartz agglomerate surfaces, following the protocol and manufacturing steps of mixing, vacuum vibrocompacting and hardening described herein. The portion of feldspar granules incorporated into the artificial agglomerate stone slabs ranged from 4 wt. % to 25 wt. %, related to the weight of the slabs.

In summary, the micronized feldspar granules of the invention were used to replace partially or fully the micronized quartz normally used for the production of commercial agglomerate quartz slabs. In all the cases, the slabs could be manufactured without problems or important changes in the current agglomerate quartz slabs production process, only with a slight adjustment of the concentration of the pigments used to maintain the same color hues. The slabs comprising the feldspar granules according to the invention showed similar characteristics regarding resistance to abrasion, scratch, staining or chemical attacks as the slabs produced with quartz. However, the slabs with the inventive feldspar granules contained a lower content of crystalline silica, which resulted in lower emission of respirable crystalline silica when the slabs were cut, gauged and/or polished.

The invention claimed is:

1. An artificial agglomerate stone material comprising inorganic fillers and a hardened organic resin, wherein the inorganic fillers comprise feldspar granules comprising a combination of oxides according to Formula A:

| | Formula A |
|---|---|
| $SiO_2$ | 60.0-69.5 wt. % |
| $Al_2O_3$ | 17.0-20.0 wt. % |
| $Na_2O$ | 10.0-11.9 wt. % |
| $K_2O$ | 0.0-2.0 wt. % |
| $Fe_2O_3 + TiO_2$ | 0.0-0.5 wt. % | based on the weight of the feldspar granules.

2. The artificial agglomerate stone material according to claim 1, wherein the feldspar granules of Formula A comprise:

| | Range (wt. %) |
|---|---|
| $SiO_2$ | 60.0-68.0 wt. % |
| $Al_2O_3$ | 17.0-20.0 wt. % |
| $Na_2O$ | 10.0-11.9 wt. % |
| CaO | 0.0-6.0 wt. % |
| $K_2O$ | 0.0-1.0 wt. % |
| $Fe_2O_3 + TiO_2$ | 0.0-0.5 wt. % | based on the weight of the feldspar granules.

3. The artificial agglomerate stone material according to claim 1, wherein the sum of the weight percentages of $SiO_2$, $Al_2O_3$, $Na_2O$ and $K_2O$ in the feldspar granules is at least 85 wt. %, based on the weight of the feldspar granules.

4. The artificial agglomerate stone material according to claim 1, wherein the ratio of weight percent of $SiO_2/Al_2O_3$ in the feldspar granules is 3.2-3.8.

5. The artificial agglomerate stone material according to claim 1, wherein the feldspar granules comprise crystalline silica in a range 0-10.0 wt. % based on the weight of the feldspar granules.

6. The artificial agglomerate stone material according to claim 1, wherein the feldspar granules comprise a crystalline phase in a range 80.0-99.0 wt. %, based on the weight of the feldspar granules.

7. The artificial agglomerate stone material according to claim 1, wherein the feldspar granules have a particle size D90<50 micrometers.

8. The artificial agglomerate stone material according to claim 1, wherein the amount of feldspar granules is from 2 to 70 wt. % based on the weight of the artificial agglomerate stone material.

9. The artificial agglomerate stone material according to claim 1, wherein the artificial agglomerate stone material comprises crystalline silica content of the artificial agglomerate stone material is in an amount <15 wt. %, relative to the weight of the material.

10. The artificial agglomerate stone material according to claim 1, wherein:
the inorganic fillers further comprises inorganic fillers different from the feldspar granules selected from recycled silicate glass granules, silicate frit granules, ceramic granules, and mixture thereof;

and/or the amount of the inorganic fillers is at least 70 wt. % based on the weight of the artificial agglomerate stone material.

11. The artificial agglomerate stone material according to claim 1, having an apparent density of 2000-2600 kg/m3.

12. The artificial agglomerate stone material according to claim 1, which is in the form of a block, slab, board or plate.

13. The artificial agglomerate stone material according to claim 1, wherein the feldspar granules of Formula A comprise:

|  | Range (wt. %) |
| --- | --- |
| $SiO_2$ | 63.0-68.0 wt. % |
| $Al_2O_3$ | 18.0-19.5 wt. % |
| $Na_2O$ | 10.0-11.5 wt. % |
| CaO | 0.0-3.0 wt. % |
| $K_2O$ | 0.0-1.0 wt. % |
| $Fe_2O_3 + TiO_2$ | 0.0-0.5 wt. % | based on the weight of the feldspar granules.

14. The artificial agglomerate stone material according to claim 1, wherein the sum of the weight percentages of $SiO_2$, $Al_2O_3$, $Na_2O$ and $K_2O$ in the feldspar granules is at least 90 wt. %, based on the weight of the feldspar granules.

15. The artificial agglomerate stone material according to claim 1, wherein the ratio of weight percent of $SiO_2/Al_2O_3$ in the feldspar granules is 3.2-3.6.

16. The artificial agglomerate stone material according to claim 1, wherein the feldspar granules comprise crystalline silica in a range 0-5.0 wt. % based on the weight of the feldspar granules.

17. The artificial agglomerate stone material according to claim 1, wherein the feldspar granules have a particle size D90 is between 10-40 micrometers.

18. The artificial agglomerate stone material according to claim 1, wherein the amount of feldspar granules is from 2 to 50 wt. % based on the weight of the artificial agglomerate stone material.

19. A process for preparing an artificial agglomerate stone material as defined in claim 1, comprising:
 a) mixing a hardenable organic resin and inorganic fillers comprising the feldspar granules as defined in claim 1,
 b) vacuum vibrocompacting the unhardened mixture obtained in a) in a mold, and
 c) hardening the compacted mixture obtained in b).

* * * * *